United States Patent [19]

Irwin et al.

[11] Patent Number: 4,486,215

[45] Date of Patent: Dec. 4, 1984

[54] QUADRUPLE CAVITY GLASS MOLD OPERATING APPARATUS

[75] Inventors: George W. Irwin, Holland, Ohio; Eustace H. Mumford, Ottawa Lake, Mich.

[73] Assignee: Owens-Illinois, Inc., Toledo, Ohio

[21] Appl. No.: 498,383

[22] Filed: May 26, 1983

[51] Int. Cl.³ .............................................. C03B 9/40
[52] U.S. Cl. ........................................ 65/360; 65/357
[58] Field of Search ......................... 65/300, 357, 360

[56] References Cited

U.S. PATENT DOCUMENTS 3,472,639  10/1969  Mumford .......................... 65/360 X
3,607,207   9/1971  Dahms .............................. 65/360 X
3,721,545   3/1973  Irwin ................................ 65/360 X Primary Examiner—Arthur Kellogg
Attorney, Agent, or Firm—Gerald T. Welch; Myron E. Click

[57] ABSTRACT

The disclosed apparatus is a quadruple gob glass parison forming machine. Its distinguishing features are the mounting of the mold carrying inserts in the mold arms so that equal closing forces will be applied to all the molds, and that the mold arms are formed with extensions so that a conventional mold closing motor can by coupled to the arms and the closing force will be greater by at least 25%. The four molds are opened and closed within the space that has normally been considered cramped, even when three molds were being used.

5 Claims, 6 Drawing Figures

QUADRUPLE CAVITY GLASS MOLD OPERATING APPARATUS

BACKGROUND OF THE INVENTION

This invention relates to glass forming machines and, in particular, to the parison or blank forming mechanism on the I.S. type of glass forming machine shown in the Ingle U.S. Pat. No. 1,911,119. In this patent, a glass forming charge is delivered to a parison mold at a parison molding station where the charge is shaped by settle blow and counterblowing the glass at the station to form a parison. The parison thereafter is inverted and transferred to a blow molding station where it is blown into its final shape.

Where a plurality of charges are to be delivered simultaneously to a plurality of parison molds at the parison molding station, considerable difficulty is encountered in providing sufficient clearance so that large diameter articles can be produced on a machine that basically has the same overall dimension as the above referred to conventional machine. Prior U.S. Pat. No. 3,721,545 to Irwin, of common assignee with present application, discloses a triple cavity glass forming apparatus. In the apparatus disclosed in U.S. Pat. No. 3,721,545, the distance from the mold arm hinge post 27 to the center of the neck mold invert arm axis, limits the mechanism to a triple gob glass forming machine. To increase the number of mold cavities provided on the basic machine would require a major expansion of the machine base and thus affect the entire layout of a glass container manufacturing plant.

The mechanism for opening and closing the parison molds, and the manner in which they are mounted on the arms for supporting them, is a significant arrangement in the present invention, and it is an object of the present invention to provide apparatus which will give equal closing forces on all of the four side-by-side parison mold haves, with the clamping of the parison molds in their closed position being carried out through the operation of existing crank arm mechanism on the conventional or existing I.S. machines.

It is a further object of this invention to provide apparatus for operation of the molds in which the mold arms are designed, such that they give greater closing forces on the long arms necessary to support four parison molds.

SUMMARY OF THE INVENTION

A glass forming machine wherein four charges are formed into parisons at a parison molding station and thereafter transferred to a blow molding station, where they are blown into final shape, where means are provided for mounting the parison molds at the parison molding station in such a manner that they may move away from one another a sufficient distance to provide clearance of the neck molds so they can pass between the open molds while still confining the molds to the area permitted between the mechanisms that are presently on the standard I.S. type glass forming machine. The manner of applying the closing forces to the molds is such as to increase the force more than 25% greater than that achieved on the conventional triple cavity machine. The hinge post for the parison mold arms is placed a greater distance from the invert axis, yet the base of the machine is no larger.

DETAILED DESCRIPTION OF THE DRAWINGS

Figure 1:
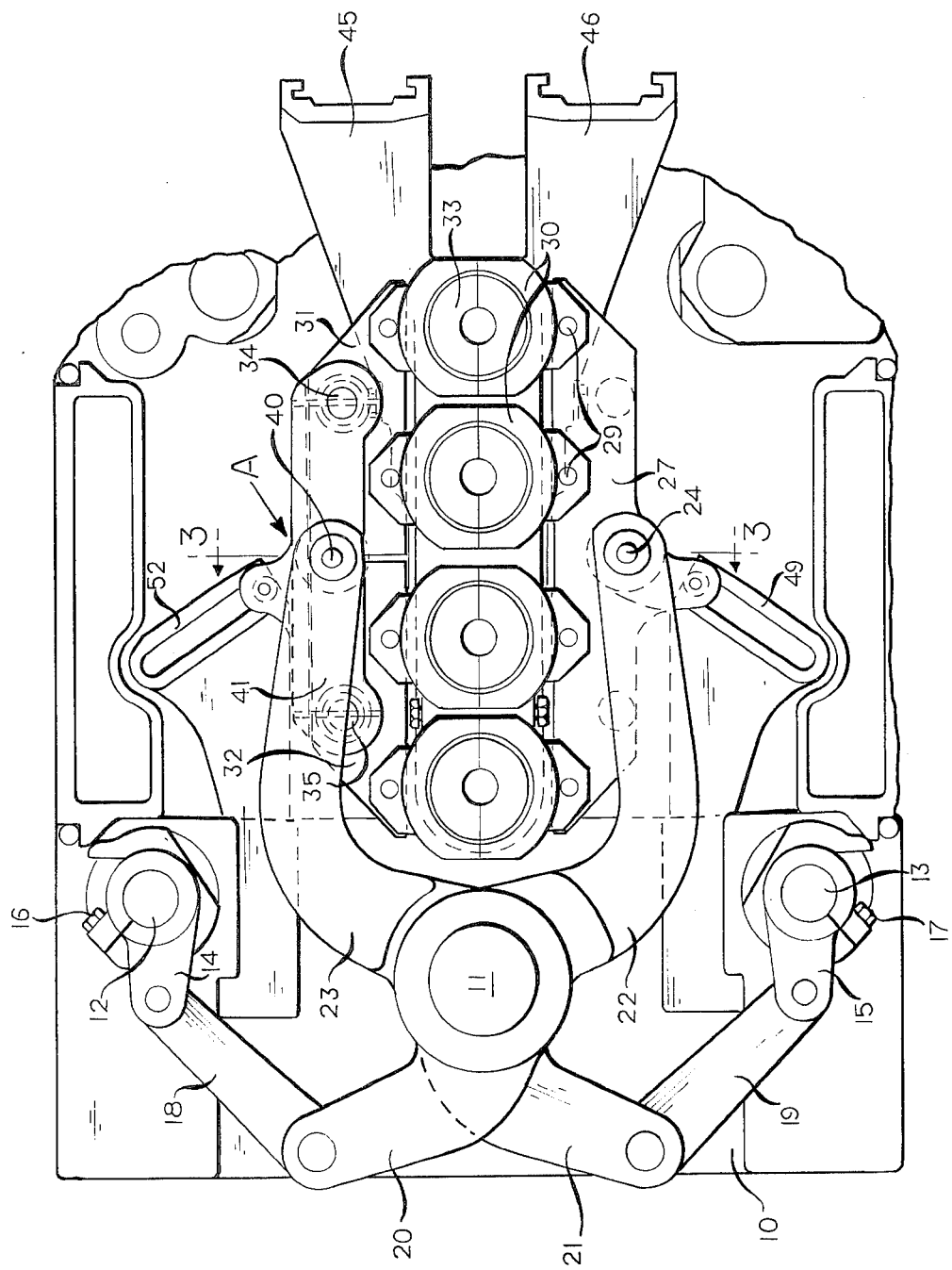
FIG. 1 is a top plan view of the parison forming station showing the mold handling mechanism of the invention.

With reference to the drawings, and in particular FIG. 1, the apparatus embodying invention includes a base 10 upon which the mold mechanisms are supported. Standing vertically upward from the base, adjacent one end thereof, is a main pivot post 11. At opposite sides and slightly in front of the main pivot post 11 are a pair of operating shafts 12 and 13. These shafts 12 and 13 are rotated about their vertical axis through the operation of an air motor, which is located in the base of the machine, and as shown in my prior U.S. Pat. No. 3,721,545. It should be understood that both shafts 12 and 13 are rotated through the same degree of rotation, but in opposite directions at the same time, to effect the movement of mold arms 14 and 15, respectively, connected to the shafts 12 and 13. The arm 14 is clamped to the shaft 12 by the integral split sleeve formed therewith and is tightened by a bolt 16. A similar split sleeve carries the arm 15, which in turn is held fixed to the shaft 13 by a bolt 17. The arms 14 and 15 when driven by the shafts 12 and 13 will operate through links 18 and 19 to move mold arm extensions 20 and 21 of mold arms 22 and 23, respectively. It can readily be seen that the extension 20 is part of the arm 22 and the extension 21 is part of the arm 23. As the shafts 12 and 13 are rotated, they will affect the movement of the arms 22 and 23 from the position shown in FIG. 1 to the position shown in FIG. 2. The particular position of the pivot post 11 in the present invention is set at a greater distance from the invert axis than in previous machine sections, yet the section is of the same basic size.

Figure 6:
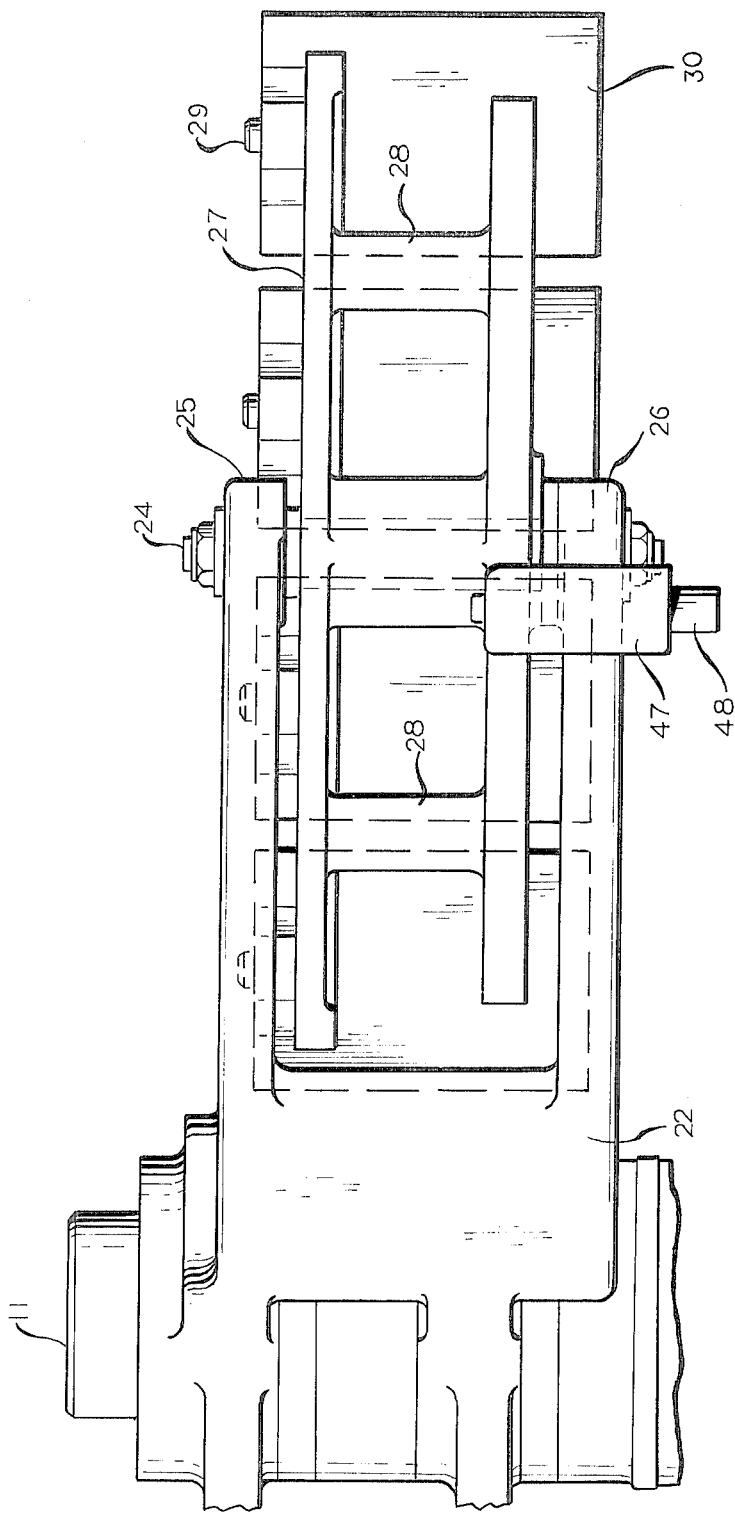
FIG. 6 is a side elevational view of the right hand arm as viewed in FIG. 1 on an enlarged scale.

The arm 22, as shown in detail in the side elevational view of FIG. 6, is bifrucated at its extending end where it supports a vertical pivot pin 24. The pivot pin 24 extends between an upper extending portion 25 and a lower extending portion 26 of the arm 22. Intermediate the portions 25 and 26 is a mold holder or insert 27. The mold insert 27 is comprised of two horizontal extending members, as best seen in FIG. 6, connected together by a pair of spaced-apart webs 28. Mold holder 27 is provided with four vertical pins 29, which extend upwardly from the upper surface thereof, with these pins 29 serving as the mounting pins for mold halves 30. In opposing relationship to the mold holder 27, there is provided a pair of linearly spaced mold holders or inserts 31 and 32. These holders or inserts 31 and 32 each have a pair of vertically extending pins 29, which serve as hangers for the mold halves 33.

Figure 2:
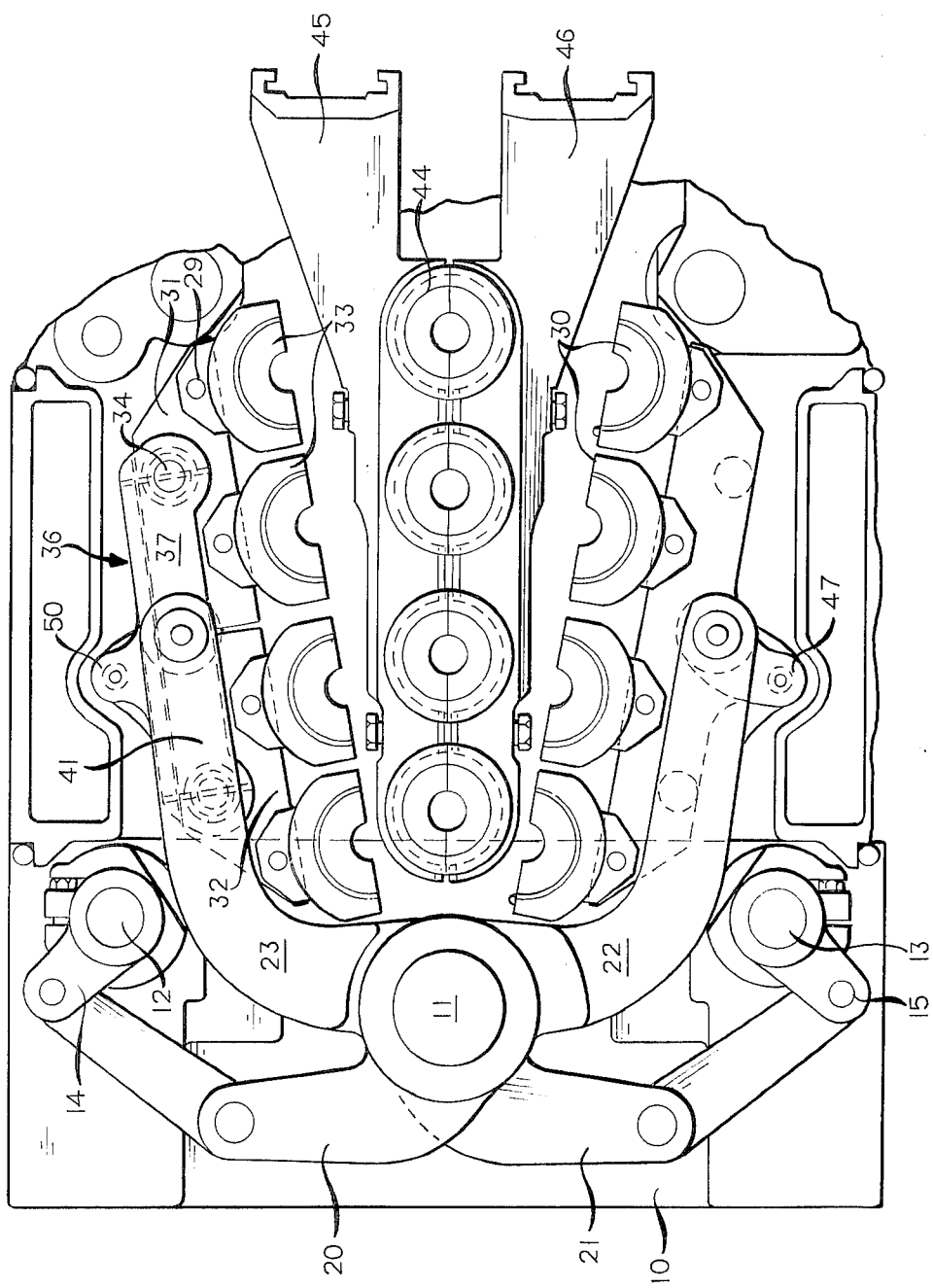
FIG. 2 is the plan view similar to FIG. 1 showing the parison molds in their opened position.
Figure 5:
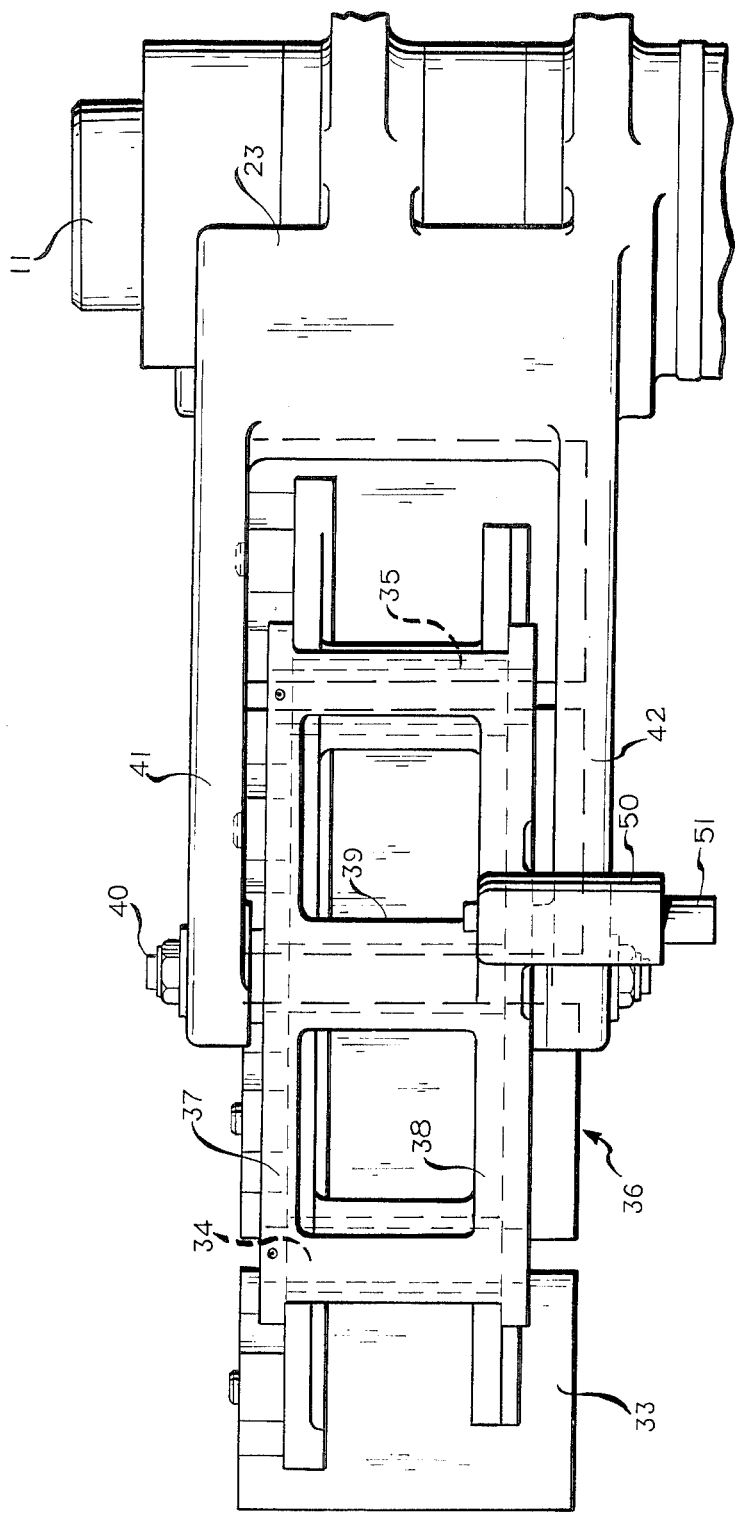
FIG. 5 is a side elevational view of the left hand arm as viewed in FIG. 1 on an enlarged scale.

As can best be seen in FIGS. 1 and 2, the inserts 31 and 32 are separated from each other by a small gap, and each is pivotally supported intermediate its ends by a pivot pin 34 and 35, respectively, which extends through and is supported at the outer ends of an equalizing bar, generally designated 36. As best shown in FIG. 5, the equalizing bar 36 is actually formed of two vertically spaced, horizontal members 37 and 38, with the center thereof provided with a vertical web 39 having a vertical passage formed therein within which a pivot pin 40 is mounted. The pivot pin has its ends extending through and beyond the members 37 and 38, and these extending ends are pivotally supported in the ends of vertically spaced fingers 41 and 42 of the arm 23. It can thus be seen that by the operation of the shafts 12 and 13, the mold arms 22 and 23 will be moved apart from the position shown in FIG. 1 and will assume the position shown in FIG. 2. Beneath the mold halves 30 and 33, as shown in FIGS. 1 and 2, are a set of neck molds 44. The neck molds 44 are actually split molds but, for puposes of explanation herein, may be considered as complete neck defining molds. The neck molds 44 are carried in a pair of support arms 45 and 46. The neck mold supporting arms 45 and 46 together constitute the invert arm of the IS type glass forming machine. It should be understood that the arms 45 and 46 are carried on a horizontal spindle such that they move through an arc of 180°. The neck molds are moved after the parison molds are opened, as shown in FIG. 2, through a path which would extend upwardly through and between the mold halves 30 and 33 in FIG. 2 as the parisons are transferred by their neck to a blow mold station.

Figure 3:
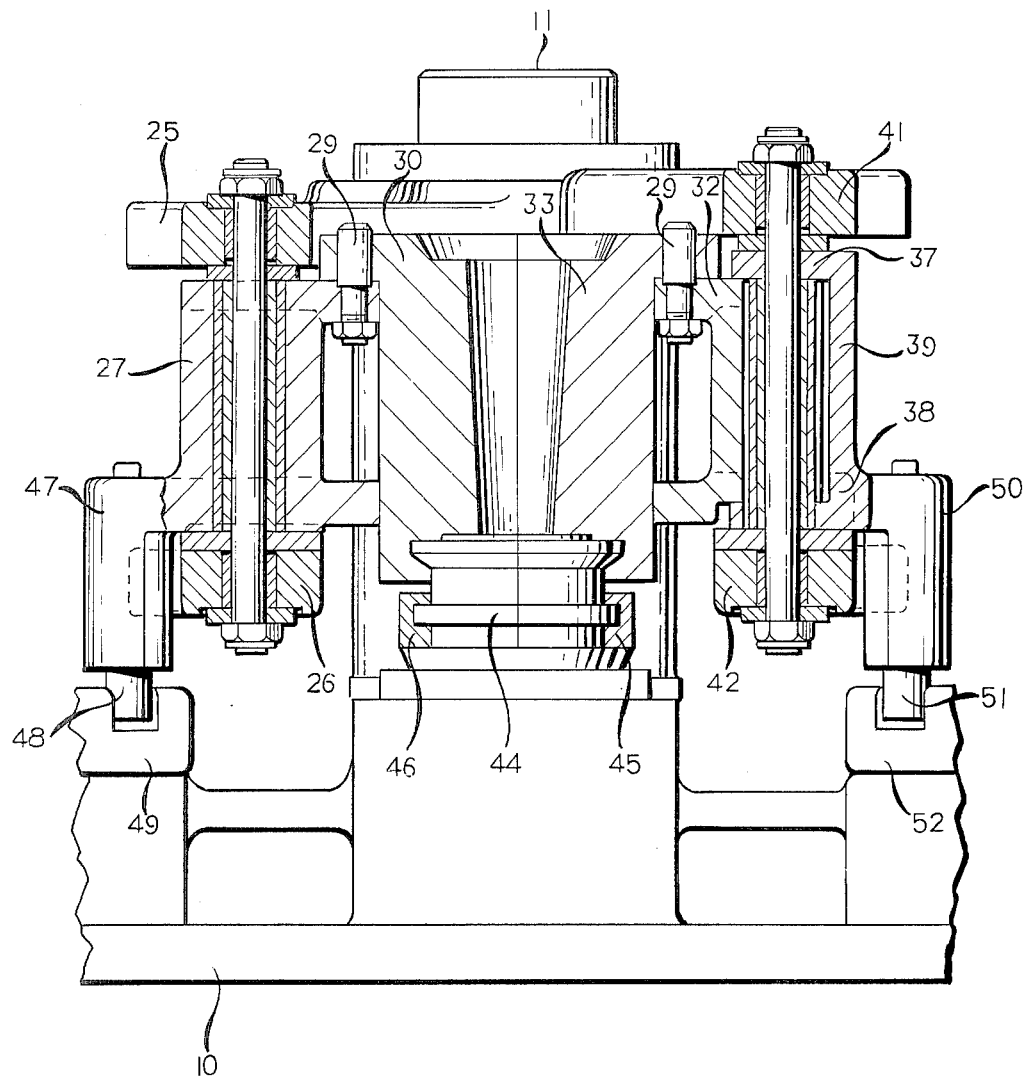
FIG. 3 is a partial cross-sectional view, on an enlarged scale, taken at line 3—3 of FIG. 1.
Figure 4:
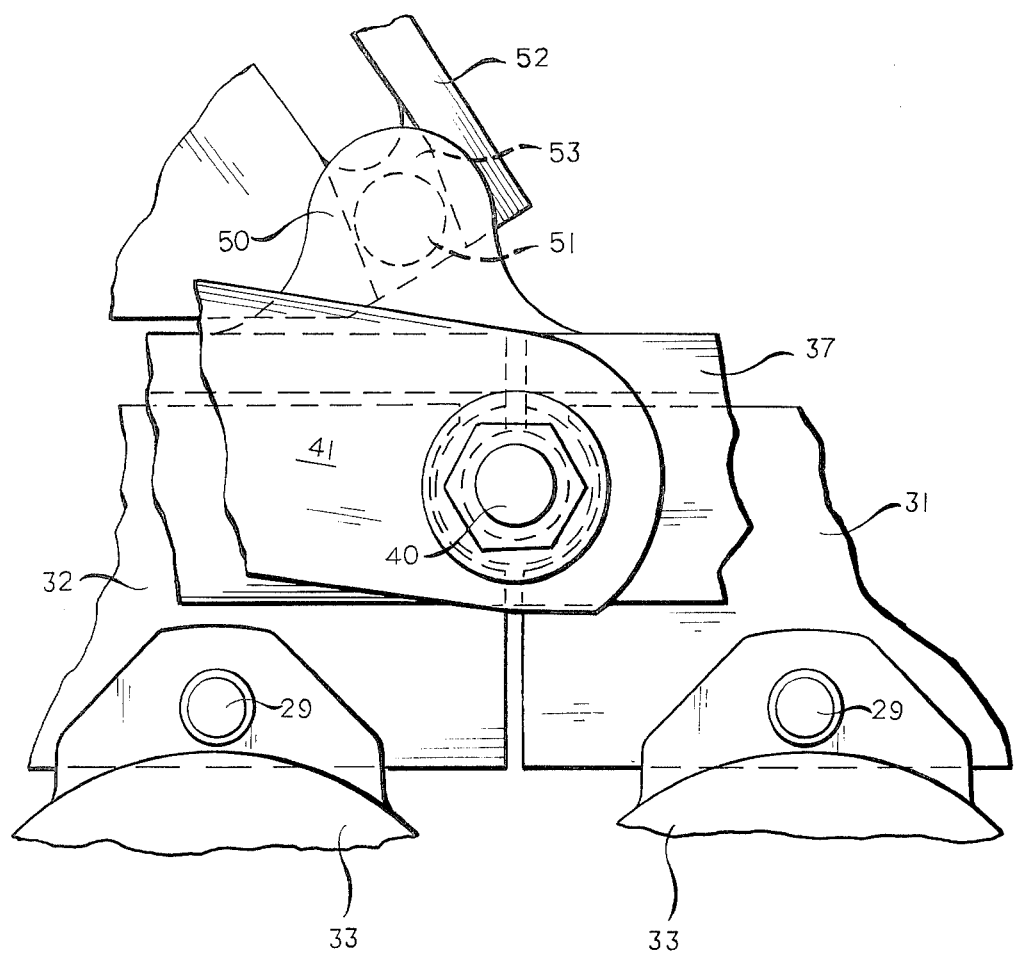
FIG. 4 is an enlarged, detailed plan view of the area designated by the arrow A on FIG. 1.

In order to get the mold halves 30 and 33 to open a sufficient amount to permit movement of the neck molds 44 and the invert arms 45 and 46 to move upwardly therebetween and still avoid the interference of the open arms with adjacent glass forming sections, it has been found necessary to provide a mold opening arrangement which is other than a straight vertical hinge. With this in view, the mold holder 27 is provided, adjacent its lower portion as perhaps best seen in FIG. 3, with a boss 47. The boss 47 has a downward extending hollow portion in which a hardened pin 48 is held. The pin 48 extends into a cam track 49. The track 49 in effect forms a box cam within which the end of the pin 48 will ride at the time the mold arm 22 is moved from its closed to opened position. The initial portion of the cam track 49 is provided with a curve area so that the molds will move generally apart as if hinged about post 11, initially, and as the arms are moved even further apart the cam track becomes straight. The follower riding in the straight portion of the track will cause the inserts 27 to pivot relative to the arm 22 in a counterclockwise direction when considering the arm 22. The opposite side mold supporting system at the side which supports the mold halves 33, the equalizing bar 36, and in particular its lower member 38, is provided with an outstanding boss 50 from which extends a pin or cam follower 51. The pin 51 rides in a cam track 52. The cam track 52, as shown specifically in FIG. 4, at the beginning 53 of its track, is provided with a curve or slanted area as specifically shown, and as previously explained, this permits the beginning motion of the movement of the arms to move the molds apart as hinged at 11. The further movement of the arms causes the mold inserts to move in a more parallel direction relative to each other as the arms are moved apart to the position shown in FIG. 2. The extensions and the mounting of the arms 22 and 23 provides an arrangement where a greater closing force may be exerted on the arms 22 and 23, as compared to how the arms were previously supported, for example, as shown in U.S. Pat. No. 3,721,545. In this particular patent, the mold carrying arms were connected to the crank arm that operates them adjacent the area between the pivot for the mold holder and the arms. Considerably more leverage is available when the arms are provided with a scissor-like hinge, as is the case in the present application, and the forces that may be applied during closing, which is the critical period in the operation of the parison mold, may be greater than that applied in the above-referred to patent. In actual practice, where the closing forces were measured, it was found that a greater than 25% increase in force was achieved.

Furthermore, it can readily be seen that four molds are being supported and moved relative to each other, in the present invention, within the confines of space which is no greater than that which was provided for in the above-referred to prior art patent.

With the foregoing in view, and description previously provided, it can be seen that an operating mechanism is provided for the parison mold in a glass forming machine wherein the four molds are all held closed with equal forces being exerted on all the molds, and that the molds may be opened an amount sufficient to permit movement of the parisons and the neck molds through the space provided between the open molds, while not requiring the molds to be opened to such an extent that they will interfere with mechanisms on adjacent forming sections. It should be kept in mind also that the machine section shown and described herein, in normal practice, is only one of a series of sections positioned side-by-side. It is common practice to provide at least adjacent sections, and there are even some machines which are made up of 10-sections all in series, abutting relationship.

We claim:

1. In a glass forming apparatus wherein a plurality of charges of glass are delivered to parison molds at a parison forming station, are formed into parisons at the parison forming station and are thereafter transferred to a blow molding station where they are blown to shape, the combination comprising:

a machine base, a pair of arms mounted on said base for swinging movement about a common axis, said arms having actuating portions extending beyond the pivot axis thereof, three flank arm inserts, four mold halves mounted on one insert and two mold halves mounted on each of the other inserts, means pivotally mounting the insert carrying four mold halves to the end of one of said arms, equalizer bar means pivotally connected to the center of each of the other two inserts for supporting the inserts for limited pivotal movement relative thereto, means pivotally mounting the center of said equalizer bar to the end of the other of said arms, a vertical shaft individual to each said arm, said shafts being positioned on opposite sides and forwardly of said common axis of said arms, means connnecting the shafts to the actuating portions of their respective arms for swinging said mold arms toward and away from one another to bring the inserts toward and away from one another and in turn close the mold halves into complementary relation to form mold cavities and move said mold halves apart for removal of parisons formed in the mold cavities, whereby the shaft on one side of said pivot axis actuates the mold arm on the opposite side of the pivot axis, with the clockwise rotation of the right hand shaft affecting the closing of the left side molds and inserts and the counterclockwise rotation of the left side shaft resulting in closing of the right side molds and inserts, interengaging cam and follower means on said base and the insert carrying the four mold halves and the equalizer bar carrying the two inserts, for guiding said insert and bar in opening and closing movement of said mold halves such that upon initial opening movement of said arms the inserts are swung in an arc about said common axis to a predetermined angular position and upon further opening of said arms causing said inserts to move farther apart and rotate relative to the arms to maintain substantially the same predetermined angular position upon full opening of the mold halves.

2. The apparatus set forth in claim 1 wherein said means interconnecting the shafts and the arms comprises, a crank arm clamped to each shaft, a link pivoted to each crank arm and to the respective arm extension of the opposite side mold supporting arm whereby rotation of the shafts through an arc of from 30° to 35° will affect movement of the arms from the full open position to the clamped, closed position.

3. The apparatus set forth in claim 2 wherein said arc of shaft rotation is 33.5°.

4. The apparatus set forth in claim 1 wherein said cam comprises an elongated track.

5. The apparatus of claim 4 wherein said track is curved in a first portion which engages the follower when the inserts are first moved from mold closing position and thereafter in a straight line.

* * * * *